United States Patent [19]

Blomquist

[11] Patent Number: 4,838,083
[45] Date of Patent: Jun. 13, 1989

[54] FLOAT ACTIVATED GAUGE

[75] Inventor: James E. Blomquist, Cedarburg, Wis.

[73] Assignee: Kelch Corp., Cedarburg, Wis.

[21] Appl. No.: 146,994

[22] Filed: Jan. 22, 1988

[51] Int. Cl.[4] .................... G01F 23/66; G01F 23/76
[52] U.S. Cl. ...................................... 73/320; 116/228
[58] Field of Search .................. 73/320, 319; 116/228

[56] References Cited

U.S. PATENT DOCUMENTS

| | | |
|---|---|---|
| 711,521 | 10/1902 | Parmelee . |
| 1,290,814 | 1/1919 | Weaver . |
| 1,295,037 | 2/1919 | Jenny ................................. 73/320 X |
| 1,344,663 | 6/1920 | Waldrep . |
| 1,366,214 | 1/1921 | Ritz-Woller . |
| 1,371,395 | 3/1921 | Rast . |
| 1,413,046 | 4/1922 | MacKenzie . |
| 1,457,471 | 6/1923 | Stivers . |
| 1,742,439 | 1/1930 | Farnsworth ........................... 73/320 |
| 1,950,142 | 3/1934 | Hastings et al. . |
| 3,168,904 | 2/1965 | Conover ............................. 137/558 |
| 4,078,430 | 3/1978 | Pemberton et al. .................. 73/311 |
| 4,129,039 | 12/1978 | Pignato ................................. 73/310 |
| 4,724,706 | 2/1988 | Stiever ................................. 73/320 |

FOREIGN PATENT DOCUMENTS 0024651 of 1912 United Kingdom ................. 73/320

*Primary Examiner*—Daniel M. Yasich
*Attorney, Agent, or Firm*—Quarles & Brady

[57] ABSTRACT

A float activated gauge for indicating the level of liquid in a tank utilizes a twisted float following member. The float following member is disposed adjacent to the float and is caused to rotate as the float moves vertically due to a change of the level of liquid in the tank. A U-shaped main body for the gauge guides the float vertically, holding the float captive and against the float following member. A needle extends at a right angle from the float following member and is externally visible to provide an indication of the amount of rotation of the float following member and, therefore, the level of liquid in the tank.

7 Claims, 1 Drawing Sheet

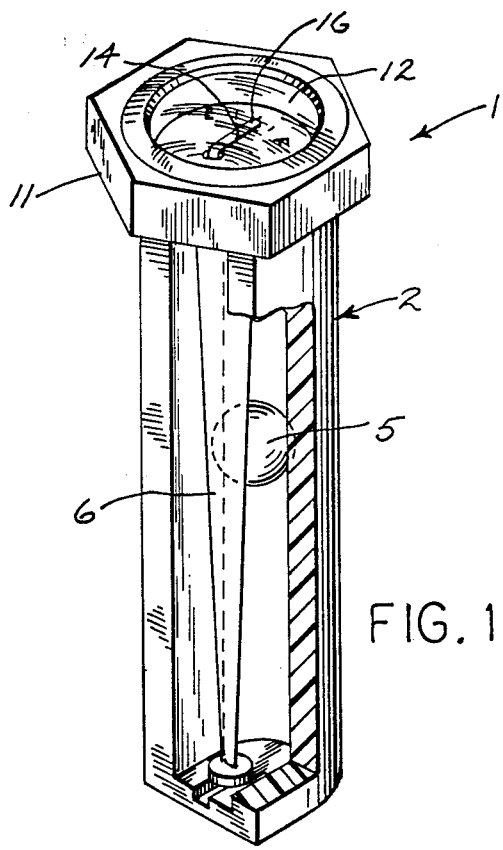
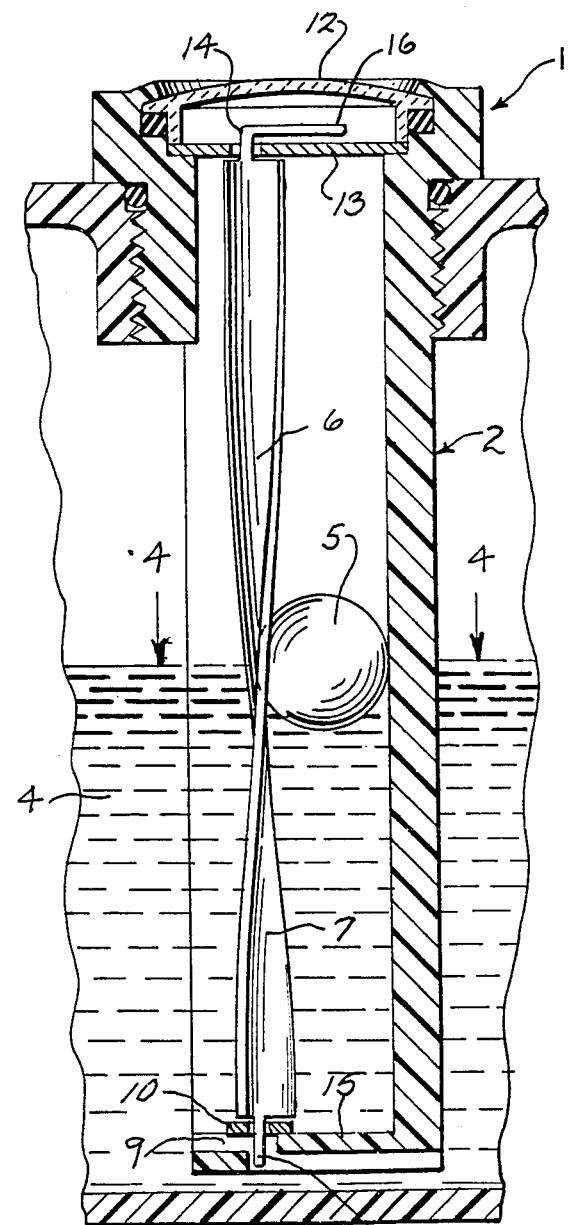
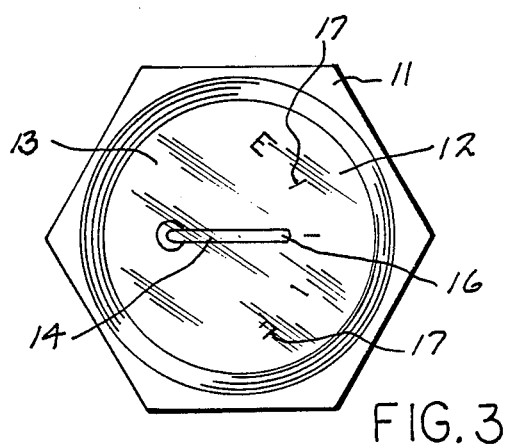
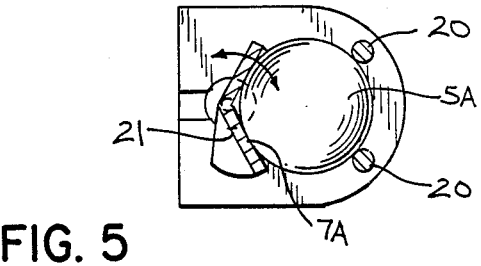
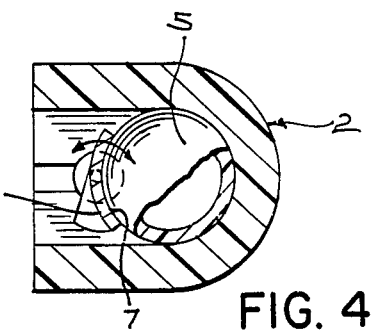
FIG. 1
FIG. 2
FIG. 3
FIG. 5
FIG. 4

FLOAT ACTIVATED GAUGE

BACKGROUND OF THE INVENTION

The field of the invention is float activated gauges. The invention appears to be especially well suited to providing float activated gauges for indicating the quantity of fuel in a fuel tank.

A common type of prior float activated gauge is depicted in U. S. Pat. 1,371,395. It comprises a float with indexing grooves which ride in a pair of guide rods, one guide rod on each side of the float. The float is thereby free to move vertically, but is restrained from twisting or rolling. A helically shaped twisted strip is disposed between the guide rods and passes through a precision slot in the float, the slot closely conforming to the cross section of the twisted strip.

As the float moves vertically, due to a change in the height of fuel in the tank, the twisted strip is forced to rotate since the float is restrained from rotating. A pointer is attached onto the end of the twisted strip and is disposed in a transparent cap. The position of the pointer is then calibrated with marking indicia to indicate the quantity of fuel in the tank.

The manufacture of such gauges is somewhat complicated in the following respects. First, the twisted strip must be thin, so that it will accurately follow in the mating slot on the float. Because the strip passes through the flot, the strip must additionally be narrow so that the float can be as small as possible. Given the forces placed on the strip, it must also be quite rigid. Thus, it is typically made of metal. Less expensive materials, for example, plastics, are not as suitable.

Secondly, the float must be formed in a precision manner, including the guide slots, the slot mating to the twisted strap, and a counterbore, or well, so that the slot portion only engages a small vertical section of the twisted strap, Operational problems may also be caused by the narrow hole in the float, for example, by jamming due to debris or due to rust or deformation of the strip.

SUMMARY OF THE INVENTION

A float activated gauge of this invention utilizes an external float following member, which follows the float by contacting on the outside surface of the float, rather than passing through the float as in prior devices. As a result, the float does not need to be restrained from rotating, and a simplified float structure is realized.

Guide means are provided to maintain the float in contact with the float following member. The float is positioned between the float following member and the guide means so as to be held captive therebetween, while still being free to move vertically. The float following member is twisted such that as the float moves vertically against the guide means, due to a change in the liquid level, the float following member is forced to rotate by contact with the float. Indicating means are attached to one end of the float following member to provide a visual indication of the height of the float.

It is an object of this invention to provide a highly simplified structure for a float activated gauge. Since the float following member does not need to pass through the float, it can be made with a sufficiently large cross sectional area to allow the use of lower cost materials for its construction. Another advantage of the external float following member is that the geometry of the float is substantially simplified. The float does not need to be restrained from rotating, and can be as simple as a spherical ball.

Another advantage of the invention is that since the guide means does not need to restrain the float from rotating, the guide means may be formed in a wide variety of shapes and from low cost materials.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention. Reference is made therefore to the claims herein for interpreting the scope of the invention.

BRIEF DESCRIPTION OF THE DRAWINGS

FIG. 1 is a top perspective view of a float activated gauge of this invention with part of one wall of the main body cut away;

FIG. 2 is a vertical sectional view of the float activated gauge of FIG. 1 shown installed in a tank;

FIG. 3 is a top plan view of the float activated gauge of FIG. 1;

FIG. 4 is a sectional view taken on line 4—4 of FIG. 2; and

FIG. 5 is a sectional view, similar to that of FIG. 4, of an alternative embodiment.

DESCRIPTION OF THE PREFERRED EMBODIMENT

Referring to FIGS. 1 and 2, a float activated gauge 1 includes a main body 2 which in operation is inserted into a tank 3 containing a liquid 4. In this exemplary embodiment, the tank 3 is a fuel tank and the liquid 4 is gasoline, although any type of container and liquid are useable with this invention.

The main body 2 forms a U-shaped channel, or guide, for a float 5. The float 5 is free to travel vertically in the main body 2, but is bounded by the u-shape of the main body 2. A float following member 6 is disposed in the opening of the U-shaped guiding portion of the main body 2, external to the float 5, such that the float 5 is held captive in the main body 2.

Referring to FIGS. 1, 2 and 4, the float 5 in this embodiment is a hollow spherical ball. Abutment surface 7 of the float following member 6 which faces the float 5 is preferably bent to conform to the float 5. The float following member 6 further contains a twist of approximately 90 degrees along the vertical axis. As the float 5 moves vertically, the float following member 6 is caused to rotate by the conforming abutment surface 7 riding on the outside of the float 5.

A base plate 15 is attached on the bottom of the main body 2. A bottom finger 8 extends from the bottom of the float following member 6 and passes through an opening in the base plate 15, into a notch 9 formed in the base plate 15. A washer 10 acts as a bearing to support the float following member 6. The notch 9 contains a step to prevent the bottom finger 8 from sliding out of the notch 9

Referring to FIGS. 1, 2 and 3, a cap 11 is formed on the upper end of the main body 2 in the usual fashion. The cap 11 includes a transparent covering 12 for viewing a plate 13 mounted underneath the transparent covering 12. The plate 13 contains an opening through which passes a top finger 14 of the float following member 6. The top finger 14 contains a right angle bend, and an indicating portion, or needle 16, which extends across the top of the plate 13. The top finger 14 in passing through the hole in the plate 13 acts as an upper bearing for the float following member 6.

As the float following member 6 rotates due to the vertical movement of the float 5, the needle 16 moves to an angle indicating the degree of rotation of the float following member 6, and therefore, the height of the float riding on the liquid 4. The plate 13 is marked with the usual indicia 17 calibrated to indicate the quantity of liquid 4 in the tank 3.

Since the float 5 does not follow a helical member passing through it, and does not need to be restrained from rotating, the construction and manufacture of the float 5 of this invention is greatly simplified. While a plastic ball is preferred, the float 5 may also be constructed in other shapes. For example, the float 5 may be cylindrical, oval, egg shaped, or even as a polygon, provided that the float following member 6 has an abutment surface 7 which follows the shape of the float 5.

It should be apparent to one skilled in the art that means for guiding the flot 5 other than the U-shaped channel of the main body 2 may be utilized (e.g. a V-shaped channel or two rods). Exact conformance of the abutment surface 7 to the float 5 is also not necessary.

For example, in a second embodiment of the invention shown in FIG. 5, the guide means for a float 5A comprises a pair of rods 20. The rods 20 function in the same manner as the U-shaped channel of the main body 2, e.g. to allow vertical movement of the float 5a while maintaining the float 5 captive against a float following member 21. Also in the embodiment of FIG. 5, an angled float following member 21 is utilized. The angled float following member 21 retains the float 5A captive against the guide rods 20, and is twisted so that the float following member 21 is rotated as the float 5 moves vertically, the same as with the curved surfaced float following member 6 in the first embodiment described above.

It should further be apparent to one skilled in the rt that many other modifications to the above described embodiments are possible within the scope of this invention. For example, the float following members 6 or 21 may be formed in any length to accommodate tanks of varying depths. It is likewise not necessary for the gauge 1 to be threaded into the tank 3 as shown in FIG. 2, but rather the gauge housing may be formed integrally as a part of the tank 3.

Also, the float following member 6 or 21 may contain lesser or greater twist than the 90 degrees described in these embodiments, to yeild corresponding changes in the degree of deflection of the top finger 14 across the plate 13. 60° to 320° of twist is preferred. The float 5 may be hollow or solid and may be formed of any material that floats and is suitable for use with the liquid 4 being measured.

I claim:

1. A float activated gauge for indicating the level of liquid in a tank comprising:
    a float;
    a float following member positionable vertically in the tank and having an abutment surface for contact with the outer peripheral surface of the float, and the abutment surface being twisted about a vertical axis and the float following member being free to rotate about said vertical axis;
    guide means for retaining the float captive between the abutment surface of the float following member and the guide means while allowing the float to move vertically with the tank liquid level; and
    indicating means attached to the float following means, the indicating means being visible from outside of the tank for providing a visual indication of the angular position of the float following member about the vertical axis;
    wherein vertical movement of the float due to changes in the level of the liquid causes the float following member to rotate, thereby positioning the indicating means at an angle indicative of the level of liquid in the tank.

2. The float activated gauge of claim 1, in which the float is a uniform spherical ball.

3. The float activated gauge of claim 2, in which the guide means is a U-shaped channel.

4. The float activated gauge of claim 2 in which the guide means comprises a pair of vertical rods.

5. The float activated gauge of claim 3, in which the amount of twist in the abutment surface is between 60 and 320 degrees.

6. The float activated gauge of claim 2, in which the abutment surface is a channel having a circular radius.

7. The float activated gauge of claim 2, in which the abutment surface comprises two flat surfaces angled with respect to each other.

* * * * *